Jan. 11, 1938.  H. HAALCK  2,105,146
GRAVITATION MEASURING INSTRUMENT
Filed July 10, 1936
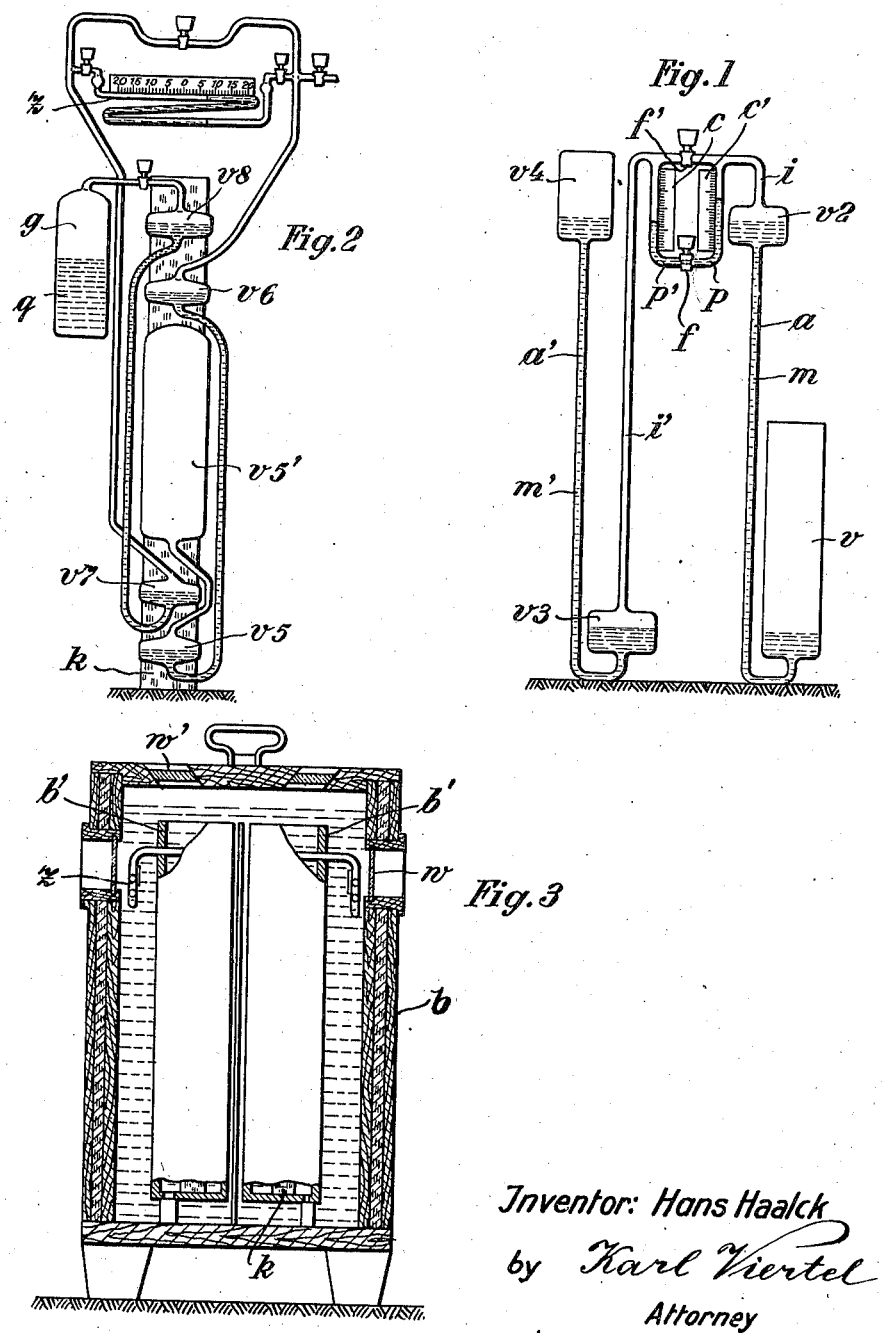
Inventor: Hans Haalck
by Karl Viertel
Attorney Patented Jan. 11, 1938

2,105,146

UNITED STATES PATENT OFFICE 2,105,146

GRAVITATION MEASURING INSTRUMENT

Hans Haalck, Potsdam, Germany, assignor to Askania-Werke A. G. vormals Centralwerkstatt-Dessau und Carl Bamberg-Friedenau, a corporation of Germany Application July 10, 1936, Serial No. 90,036
In Germany April 1, 1935

8 Claims. (Cl. 265—1.4)

My invention relates to the art of detecting in connection with surveying and geophysical exploration work, variations in the structure of the earth's crust by making comparative measurements of the force of gravity, usually designated by physicists by the symbol "g" and for convenience' sake called "gravity-constant"; the problem being to actually measure those very small differences of the value "g", which exist at certain points of the earth's surface chosen with regard to the specific geophysical work concerned.

As a matter of fact a geotectonic formation of relatively dense structure, either protruding from the earth or hidden below the earth's surface, will bring about an increase in the value of "g", while intrusion of a relatively light mass at a particular point below the earth's surface will tend to decrease the value of "g" at that point. These facts have been relied on as an aid to the location of hidden deposits of various kinds, such as salt, ores, oil etc., and exploration methods based thereon are particularly well suited to regions where definite variations of the value of "g" may be taken to indicate with fair certainity a particular geotectonic formation.

It has been discovered that certain deviations in the positive sense of the value of "g" from the normal value to be expected at the particular places under observation constitute a reliable indication, for instance, of the presence of a salt dome. This, in turn, is often indicative of a structure containing an accumulation of oil.

Various measuring methods and instruments based on geodynamic, static, magnetic, barometric and seismographical principles have been suggested for determining the variations of the factor "g", or its relative value, over large areas. Difficulties however have been experienced in many cases, in adapting the gravity testing instrument to extensive exploration work because of the great care and precision required in setting up the instrument, the length of time required for reaching the state of equilibrium of forces and obtaining the appropriate readings, the high cost of the instrument and its delicate design, which calls for highly trained operators and cautious treatment, and which renders it difficult to transport the measuring instrument into relatively inaccessible locations, and to the slowness of the measuring operations in general.

The principal object of this invention is to overcome the said drawbacks by providing a gravitational measuring or testing instrument of simple design and involving simple barometric principles, on which the differences in the factor "g" existing at various exploration points can be read with ease on a relatively large scale and without loss of time.

Another equally important object of the invention consists in providing a barometric measuring instrument distinguished by its higher sensitiveness to variations of the value "g" than that of instruments of the same type known heretofore, which will indicate gravity differences down to one tenth of a milligal, a unit of measurement recently adopted by scientists and practitioners in this field.

Other objects of the invention will incidentally become evident hereinafter to those familiar with the making of gravity measuring instruments of this class and exploration work to be carried out therewith.

The nature and scope of the invention are briefly outlined in the appended claims and will be more fully understood from the following specification taken together with the accompanying drawing showing for illustrative purposes embodiments of this invention.

Fig. 1 is a layout diagrammatically showing a gravitational measuring instrument designed according to this invention.

Fig. 2 shows a structurally modified instrument.

Fig. 3 is a cross section taken through a box containing a liquid, wherein two measuring instruments designed according to this invention are immersed.

Briefly stated the invention consists in co-operatively interconnecting in series two barometric tubes containing mercury columns by an intermediary tube, keeping in equilibrium said mercury columns by associating their respective upper and lower levels with fluids, which are under different pressure and are sealed in vessels from the atmosphere, and providing means associated with said intermediary tube and mercury columns for indicating changes of the force of gravitation reacting upon said mercury columns.

In the embodiment of the invention, shown by way of an example in Fig. 1, the gravitational measuring instrument comprises two vertical tubes $a$ and $a'$ connected at their lower and upper ends, respectively, to pairs of sealed vessels or containers $v$, $v2$ and $v3$, $v4$ and mercury columns $m$ and $m'$ in the tubes partially fill the upper and lower vessels. An intermediary tube designated $i$, $i'$, interconnects in series the tubes $a$, $a'$ by putting into communication the upper vessel $v2$ with the lower vessel $v3$. Fluids, for instance air or other gases, are contained in said vessels and intermediary tubes, by which the mercury columns $m$, $m'$ are held in equilibrium.

Said means associated with the intermediary tube $i$, $i'$ for indicating changes of the gravitation force reacting upon the mercury columns $m$, $m'$ comprise an U-shaped tube $p$, $p'$ of glass or other translucent material containing a column of a coloured liquid, for instance glycerine, and scales $c$, $c'$ the graduations of which register with the ascending and descending meniscus of said liquid column.

Damping or baffling means may be provided to advantage in said U-shaped tube $p$, $p'$ with the object of preventing undue oscillations of the liquid column, which accidentally occur and would impair the speedy reading of the scales $c$, $c'$. In the embodiment of the invention shown in Fig. 1 said damping means comprises a valve or cock $f$ provided in the lower section of tube $p$, $p'$ adapted to offer frictional resistance to the liquid passing therethrough. Another valve or cock $f'$ connects the tubes $i$, $i'$, so that on closing or opening cock $f'$ the by-pass or U-shaped tube $p$, $p'$ is in or out of operation.

Means provided for protecting the measuring instrument against any changes of temperature even the slightest are illustrated in Fig. 3. This figure shows an outer casing $b$ having double walls of insulating material and being so proportioned, that two gravitation measuring instruments of the modified design shown in Fig. 2 and described hereinafter can be inclosed therein together with inner casings $b'$ carrying the instruments proper. Windows $w$, $w'$ are provided in said box for the admission of light and for rendering visible to the operators the gravitational indicating means of the instruments, which are shown in this instance as being arranged between the containers $b'$ and the inner walls of the box $b$. The space within and around the casings $b'$ may be filled with ice water or water and cracked ice to maintain the temperature at approximately the melting point of ice. The ice water maintains the temperature of the instruments within the containers substantially constant and the insulated walls of the box prevent the ice from melting too rapidly.

The operation of the instrument is as follows:

It may be assumed that a series of measurements is to be made, beginning at a point B several miles distant from the base A, where the instrument is located, and where the operator is about to start from on his exploring expedition.

Before leaving the base A the operator should first fill the casings containing the instruments with cracked ice or with water of melting temperature having pieces of ice floating thereon, so as to keep the temperature constant at zero around the mercury tubes for a considerable length of time. Slight changes in temperature, which accidentally might occur in the water of the outer casing cannot pervade the insulating walls $b'$ and will not affect the temperature of the water inside the walls $b'$ and around the instruments proper.

At the base A the zero point of the instrument is adjusted by opening the cock $f'$ and thereby equalizing the pressure in vessels $v2$ and $v3$. After the adjustment the cock $f'$ is closed and the instrument is ready for a measurement at a point B. In order to eliminate undue oscillations of the liquid column in the tubes $p$, $p'$ the cock $f$ may be so adjusted as to offer considerable flow resistance to the liquid column.

Assuming it happens, that the force of gravity at point B is greater than at A: In this case both mercury columns $a$, $a'$ would have grown heavier during the travel of the instrument from A to B with the result, that the volume of gas contained in vessel $v3$, and in the intermediary tube $i$, and in the tube $p'$ is compressed by mercury column $m'$, and that likewise the gas within vessel $v$ is compressed by mercury column $m$, while the volume of gas in vessel $v2$, tube $i$ and by-pass tube $p$ is proportionately expanded.

Because of the combined forces of the compressed and expanded gases in the tubes $i'$ and $i$ respectively reacting in the same direction upon the column of indicating liquid in the tubes $p$, $p'$ the indicating liquid will rise in tube $p$ relatively high. A considerable increase in range of travel of the indicating liquid, is obtained, as compared with other gravitation measuring instruments, wherein only one single barometric tube is employed, by providing a couple of barometric tubes arranged in series for cooperation and combined action upon the indicating liquid. The readings or measurements taken in this manner at point B, and subsequently at other points during the exploring expedition indicate the extent of the anomalies in gravity in the particular field, and thereby reflect variations in the subsurface structures with a high degree of accuracy.

Various other changes and modifications may be conveniently made in the structural details of gravitation measuring instruments of the improved design described, without substantially departing from the spirit and the salient ideas of this invention.

Extensive experimental work carried out by the inventor with measuring instruments having two mercury columns cooperatively interconnected have revealed that the correctness of the measurements taken and the accuracy of the readings depend also on the form and arrangement of the barometric tubes relatively to each other and the vessels communicating therewith. The correctness is enhanced by arranging the vessels $v5$, $v6$, $v7$, $v8$, wherein the mercury columns terminate, in symmetric position above each other as seen in Fig. 2.

In the embodiment shown in Fig. 2 a support $k$ of cork or other suitable material is shown on which in alignment vessels $v8$, $v7$, $v6$, $v5$ are mounted with respect to the vertical axis. The vessels $v8$ and $v6$ form an upper pair, while the vessels $v7$ and $v5$ form a lower pair spaced from the upper one in a vertical direction.

For increasing the volume of the lower vessel of one of the pairs, in the illustrated example, the vessel $v5$ another vessel $v5'$ is provided communicating with the vessel $v5$ and arranged preferably between the upper and the lower pair of vessels.

For compensating for temperature influences a compensation vessel $g$ is shown including a liquid $q$ of relatively high thermal coefficient of expansion. Upon a rise in temperature the liquid $q$ will expand thereby decreasing the volume of gas in the vessel $g$ and accordingly effecting a correction of the indication.

For indicating the differential pressure between the lower of the first vessels $v8$ and $v7$ and the upper of the second vessels $v6$ and $v5$ a Z-shaped tube Z is shown inclosing a mobile liquid and cooperating with a scale. The arrangement of parts shown in this embodiment offers the advantage of being less responsive to deviations of the instrument from the true vertical which in the embodiment of Fig. 1 would cause relatively greater error in the indication.

In the operation of the instrument, it is set up and adjusted to the zero position at one location. Then, it is carried to and set up at another place to be explored. If the gravity force at the other place is different, due to the presence of ore, a salt dome or other deposits, the effect of gravity on both mercury columns will vary accordingly. One column varies the compression of the gas in the lower vessel and the other column varies the expansion of the gas in the upper vessel. The differential pressure readable at the graduated scale or scales, is a function of the gravity force.

Obviously, the invention is not limited to the particular embodiments thereof herein shown and described.

What I claim is:

1. A gravity responsive instrument comprising, in combination, two vertically spaced first vessels; a charge of gas in each first vessel; a first conduit connecting said first vessels; a first mercury column in said first conduit, thereby tending to vary the expansion and compression of the gas in the upper and lower first vessels, respectively, when the instrument is subjected to variations in gravitational force; two vertically spaced second vessels; a charge of gas in each second vessel, a second conduit connecting said second vessels; a second mercury column in said second conduit, thereby tending to vary the expansion and compression of the gas in the upper and lower second vessels, respectively, when the instrument is subjected to variations in gravitational force; and indicating means responsive to a pressure differential in the lower first and upper second vessel, the differential pressure being a function of the gravitational force acting on said mercury columns.

2. A gravity responsive instrument comprising, in combination, two vertically spaced first vessels; a charge of gas in each first vessel; a first conduit connecting said first vessels; a first mercury column in said first conduit, thereby tending to vary the expansion and compression of the gas in the upper and lower first vessels, respectively, when the instrument is subjected to variations in gravitational force; two vertically spaced second vessels; a charge of gas in each second vessel; a second conduit connecting said second vessels; a second mercury column in said second conduit, thereby tending to vary the expansion and compression of the gas in the upper and lower second vessels, respectively, when the instrument is subjected to variations in gravitational force; a U-shaped tube communicating with said lower first and upper second vessels; and a liquid in said tube which is thereby moved in response to a differential pressure in said lower first and upper second vessel, the differential pressure being a function of the gravitational force acting on said mercury columns.

3. A gravity responsive instrument comprising, in combination, two vertically spaced first vessels; a charge of gas in each first vessel; a first conduit connecting said first vessels; a first mercury column in said first conduit, thereby tending to vary the expansion and compression of the gas in the upper and lower first vessels, respectively, when the instrument is subjected to variations in gravitational force; two vertically spaced second vessels; a charge of gas in each second vessel; a second conduit connecting said second vessels; a second mercury column in said second conduit, thereby tending to vary the expansion and compression of the gas in the upper and lower second vessels, respectively, when the instrument is subjected to variations in gravitational force; a U-shaped tube communicating with said lower first and upper second vessel; a liquid in said tube which is thereby acted upon by a pressure differential in said lower first and upper second vessels; and means for dampening oscillations of said liquid in said tube.

4. A gravity responsive instrument comprising, in combination, two vertically spaced first vessels; a charge of gas in each first vessel; a first conduit connecting said first vessels; a first mercury column in said first conduit, thereby tending to vary the expansion and compression of the gas in the upper and lower first vessels, respectively, when the instrument is subjected to variations in gravitational force; two vertically spaced second vessels; a charge of gas in each second vessel; a second conduit connecting said second vessels; a second mercury column in said second conduit, thereby tending to vary the expansion and compression of the gas in the upper and lower second vessels, respectively, when the instrument is subjected to variations in gravitational force; indicating means responsive to a pressure differential in said lower first and upper second vessel; and means for by-passing said pressure responsive means to effect a zero adjustment of the instrument.

5. A gravity responsive instrument comprising, in combination, two vertically spaced first vessels; a charge of gas in each first vessel; a first conduit connecting said first vessels; a first mercury column in said first conduit, thereby tending to vary the expansion and compression of the gas in the upper and lower first vessels, respectively, when the instrument is subjected to variations in gravitational force; two vertically spaced second vessels; a charge of gas in each second vessel; a second conduit connecting said second vessels; a second mercury column in said second conduit, thereby tending to vary the expansion and compression of the gas in the upper and lower second vessels, respectively, when the instrument is subjected to variations in gravitational force; a U-shaped tube communicating with said lower first and upper second vessels; a valve in said tube; a liquid in said tube, the liquid being thereby acted upon by a pressure differential in said lower first and upper second vessels; a by-pass conduit connecting said lower first and upper second vessels; and a valve in said by-pass conduit.

6. A gravity responsive instrument comprising, in combination, two vertically spaced first vessels; a charge of gas in each first vessel; a first conduit connecting said first vessels; a first mercury column in said first conduit, thereby tending to vary the expansion and compression of the gas in the upper and lower first vessels, respectively, when the instrument is subjected to variations in gravitational force; two vertically spaced second vessels; a charge of gas in each second vessel; a second conduit connecting said second vessels; a second mercury column in said second conduit, thereby tending to vary the expansion and compression of the gas in the upper and lower second vessels, respectively, when the instrument is subjected to variations in gravitational force; a body of liquid arranged to increase and decrease the volume of said upper first vessel by thermal contraction and expansion to compensate for changes in temperature affecting the gas; and indicating means responsive to a pressure differential in the lower first and upper second vessel, the differential pressure being a function of the gravitational force acting on said mercury columns.

7. A gravity responsive instrument comprising, in combination, two vertically spaced first vessels; a charge of gas in each first vessel; a first conduit connecting said first vessels; a first mercury column in said first conduit, thereby tending to vary the expansion and compression of the gas in the upper and lower first vessels, respectively, when the instrument is subjected to variations in gravitational force; two vertically spaced second vessels, said first and second vessels being aligned with respect to the vertical axis, whereby the upper and the lower vessels are positioned vertically adjacent to each other, forming pairs; a charge of gas in each second vessel; a second conduit connecting said second vessels; a second mercury column in said second conduit, thereby tending to vary the expansion and compression of the gas in the upper and lower second vessels, respectively, when the instrument is subjected to variations in gravitational force; a further vessel communicating with the lower vessel of one of said pairs; and indicating means responsive to a pressure differential in the lower first and upper second vessel, the differential pressure being a function of the gravitational force acting on said mercury columns.

8. A gravity responsive instrument comprising, in combination, two vertically spaced first vessels; a charge of gas in each first vessel; a first conduit connecting said first vessels; a first mercury column in said first conduit, thereby tending to vary the expansion and compression of the gas in the upper and lower first vessels, respectively, when the instrument is subjected to variations in gravitational force; two vertically spaced second vessels; a charge of gas in each second vessel; a second conduit connecting said second vessels; a second mercury column in said second conduit, thereby tending to vary the expansion and compression of the gas in the upper and lower second vessels, respectively, when the instrument is subjected to variations in gravitational force; indicating means responsive to a pressure differential in the lower first and upper second vessel; an inner instrument casing in which said vessels and conduits are mounted with the said indicating means protruding therefrom; an outer instrument casing surrounding said inner casing and having an observation window through which said indicating means may be observed; and a filling of ice and water at melting temperature in said outer and inner casing for maintaining said vessels and conduits at an even temperature.

HANS HAALCK.